United States Patent
García Abad

(10) Patent No.: US 11,523,032 B2
(45) Date of Patent: Dec. 6, 2022

(54) OPTICAL IMAGE SENSING DEVICE FOR A MOTOR VEHICLE

(71) Applicant: Ficosa Adas, S.L.U., Barcelona (ES)

(72) Inventor: Daniel García Abad, Viladecavalls (ES)

(73) Assignee: FICOSA ADAS, S.L.U., Barcelona (ES)

(*) Notice: Subject to any disclaimer, the term of this patent is extended or adjusted under 35 U.S.C. 154(b) by 180 days.

(21) Appl. No.: 16/911,530

(22) Filed: Jun. 25, 2020

(65) Prior Publication Data

US 2021/0006691 A1    Jan. 7, 2021

(30) Foreign Application Priority Data

Jul. 1, 2019  (EP) ...................... 19382562

(51) Int. Cl.
*H04N 5/225*      (2006.01)
*G03B 17/02*      (2021.01)
(Continued)

(52) U.S. Cl.
CPC ............ *H04N 5/2252* (2013.01); *B60R 1/06* (2013.01); *B60R 1/12* (2013.01); *B60R 11/00* (2013.01);
(Continued)

(58) Field of Classification Search
CPC .. H04N 5/2251; H04N 5/2252; H04N 5/2253; H04N 5/2254; H04N 5/2257;
(Continued)

(56) References Cited

U.S. PATENT DOCUMENTS

2005/0041148 A1* 2/2005 Bae ...................... H04M 1/0218
                                                    348/E7.079
2009/0091651 A1    4/2009 Artsiely
(Continued)

FOREIGN PATENT DOCUMENTS

CN       207261940 U    4/2018
CN       207817388 U    9/2018
(Continued)

OTHER PUBLICATIONS

Extended European Search Report for European Application No. 19382562.7; Date of Completion: Dec. 19, 2019; dated Jan. 14, 2020; 7 Pages.

*Primary Examiner* — Twyler L Haskins
*Assistant Examiner* — Akshay Trehan
(74) *Attorney, Agent, or Firm* — Cantor Colburn LLP

(57) ABSTRACT

An optical device includes a housing, a first optical subassembly, and a second optical subassembly. The housing includes first and second surfaces having respective first and second openings. The first optical subassembly includes a first lens and a first image sensor received in the first opening. The second optical subassembly is arranged at an angle with respect to a first optical axis, and includes a second lens and a second image sensor received in the second opening. The first and/or second opening is larger than the corresponding first or second image sensor such that a gap exists therebetween for the optical subassembly to be positioned with the corresponding optical axis at a given orientation before the optical subassemblies are attached to the housing.

18 Claims, 1 Drawing Sheet

(51) Int. Cl.
*B60R 1/06* (2006.01)
*B60R 11/04* (2006.01)
*G03B 17/56* (2021.01)
*G03B 19/22* (2021.01)
*G02B 7/02* (2021.01)
*B60R 1/12* (2006.01)
*B60R 11/00* (2006.01)
*H04N 7/18* (2006.01)

(52) U.S. Cl.
CPC ............... *B60R 11/04* (2013.01); *G02B 7/02* (2013.01); *G03B 17/02* (2013.01); *G03B 17/561* (2013.01); *G03B 19/22* (2013.01); *H04N 5/2254* (2013.01); *H04N 7/18* (2013.01); *B60R 2001/1253* (2013.01); *B60R 2011/004* (2013.01); *B60R 2011/0042* (2013.01); *B60R 2300/802* (2013.01)

(58) Field of Classification Search
CPC .......... H04N 5/2258; H04N 7/18; B60R 1/06; B60R 1/12; B60R 11/00; B60R 11/04; B60R 2001/1253; B60R 2011/004; B60R 2011/0042; B60R 2300/802; G02B 7/02; G03B 17/02; G03B 17/561; G03B 19/22
USPC ......... 348/148–149, 159, 373–376; 396/535, 396/541
See application file for complete search history.

(56) References Cited

U.S. PATENT DOCUMENTS

| | | | |
|---|---|---|---|
| 2015/0002623 | A1 | 1/2015 | Masugi et al. |
| 2016/0318457 | A1* | 11/2016 | Nakano .................. B60R 11/04 |
| 2018/0246290 | A1* | 8/2018 | Wang ................ G02B 13/0045 |

FOREIGN PATENT DOCUMENTS

| | | | | | |
|---|---|---|---|---|---|
| EP | 1511312 | A1 | | 3/2005 | |
| JP | 2004112553 | A | | 4/2004 | |
| JP | 2004112553 | A | * | 8/2004 | ............ G03B 17/56 |
| WO | 2017124038 | A1 | | 7/2017 | |

* cited by examiner

OPTICAL IMAGE SENSING DEVICE FOR A MOTOR VEHICLE

CROSS-REFERENCE TO RELATED APPLICATIONS

This application claims the benefit of European Application Serial No. 19382562.7 filed Jul. 1, 2019, the disclosure of which is incorporated herein by reference in its entirety.

FIELD OF THE INVENTION

The present disclosure relates to exterior rear-view mirrors for motor vehicles, and more specifically, to rear view mirrors comprising a camera housing and subassemblies received therein having a lens and an image sensor or photo-sensor.

BACKGROUND

Exterior rear-view mirrors in motor vehicles are known including one or more cameras to help drivers to see rear and side areas of the motor vehicle, outside the driver's peripheral vision. Such cameras may be located at different locations and orientations in the exterior rear-view mirror.

In applications involving camera monitoring system (CMS), one camera is arranged in the motor vehicle pointing out substantially to a rearward direction. On the other hand, in top-view applications, also referred to as panoramic vision or surrounding vision, a camera is arranged pointing out substantially to the ground.

As used herein, the term substantially refers to cameras oriented not totally vertical in top-view applications or to cameras oriented not totally parallel to the ground in CMS applications. The final design, that is, the final position and orientation of the camera, depends ultimately on the design of the motor vehicle such as the length of the motor vehicle, the height of the exterior rear view mirror, the overall shape of the vehicle, in particular, of the exterior surface where the cameras are to be mounted such as for example in an outer surface of a motor vehicle door which are usually not completely flat, and other mounting locations.

Digital cameras are also known in the art in which a lens is attached (e.g., glued) to a camera housing. The camera housing has a front portion and a rear portion welded together such as by ultrasonic welding when both parts are made of plastic or by laser welding when both parts are made of aluminium or joined together by means of fasteners such as by means of a screw and a rubber gasket. Such prior art digital camera further comprises an image sensor or photo-sensor and an adapter. The photo-sensor is connected to a printed circuit board (PCB) where image processing is performed.

The position and the orientation of the cameras to the motor vehicle is critical. Motor vehicles are increasingly autonomous so cameras are required not only to detect the environment, but also to make decisions on the captured image. Some of these decisions may be line detection, warning side collisions (WSC), blind spot detection (BSD), and so on. If cameras are not well placed, errors may occur. For example, an increase of height of the car due to a new tire or a new suspension may be enough to cause critical errors on the already mentioned line detectors (LD), WSC, BSD, and others.

An easy, well-known solution may be rotating the exterior rear-view mirror system where the camera is located to a new position where errors do not occur. Said solution may be suitable when an optical device only includes a single camera, either in top-view or CMS systems. In that case, proper focusing is obtained by suitably rotating the camera carrier, that is, the exterior rear-view mirror or winglet. However, when the exterior rear-view mirror or winglet has more than one camera having different orientations or focus, then correcting orientations is not so easy by merely rotating the exterior rear-view mirror or the winglet since it involves rotating the two cameras at the same time.

Exterior rear-view mirrors including two cameras comprise a first rearward facing camera and a second camera substantially facing the ground. The first rearward facing camera provides images for camera monitoring system (CMS) which could be also used for any type of display such as for example an interior or central rear-view mirror which may be useful, for example, for parking. The second camera substantially faces the ground at an angle usually outwards. Overlays may be optionally provided such as for example guidelines showing the motor vehicle parking process or where the wheels will roll of according to turning of the steering wheel.

In practice, it has been found that provision of first and second cameras takes up much space and it is therefore not practical. Furthermore, each car model has different dimensions in terms of height and length so different rear view mirror or winglet sizes are required forcing the cameras to be specifically positioned and oriented. For example, a first car model could require a top-view camera to be oriented a given angle such as 4° from the vertical diverted towards the direction of the car, and a CMS camera to be oriented a given angle such as 9° outwards and to the direction of the ground. However, a second car model could require a top-view camera to be oriented 5° from the vertical diverted towards the direction of the car, and a CMS camera to be oriented 8° outwards and to the direction of the ground. As a result, different camera housings for different car models will be then required. This involves different moulds for making the camera housings for each car model as the camera housings are typically manufactured in an injection moulding process.

It is thus an object of the present disclosure to provide a single device located in a motor vehicle such as in a winglet, configured to output top-view images and rear-view images with which the above disadvantages can be at least mitigated.

A further object of the present disclosure is to provide a flexible design for an optical device than can be adjusted with respect to the vehicle where it is to be installed before being attached thereto.

SUMMARY

An optical device for a motor vehicle as claimed in claim 1 is disclosed herein. The present optical device can be arranged for example on a motor vehicle rear view mirror and on a motor vehicle winglet. The present optical device may be part of an exterior rear-view mirror located in a mounting assembly for capturing images from an exterior field of view of the motor vehicle. The field of view may extend at least sideward and rearward outside the vehicle and encompasses a portion of the exterior part of the vehicle.

In particular, the present optical device comprises a housing that comprises at least a first surface, a first optical subassembly having a first optical axis and comprising a first lens, a first image sensor responsible for top-view applications, that is, panoramic vision or surrounding vision such as a camera arranged pointing out substantially to the ground. The first image sensor of the first optical subassembly is aligned to the first lens. A bracket suitable for holding the lens and for supporting the first image sensor is also provided. The bracket may hold an electronics carrier or substrate such as a PCB. The image sensor is mounted in the PCB. Thus, the bracket directly or indirectly holds the electronics carrier.

Attaching means are also provided to bring the first optical subassembly into a first condition in which it can be moved relative to the first surface of the housing and into a second condition in which an interface, that is at least partially mounted on the first surface of the housing, is fixedly attached to the first surface of the housing. The attaching means may be located between the interface and the first surface of the housing, in contact thereto. The attaching means may be glue or an adhesive such as a sticker. Other attaching means are of course possible. The attaching means may comprise a sealing means. The attaching means can be cured such as for example by ultraviolet light, and high temperature. The interface may be arranged to extend outwardly relative to the first optical axis.

A second optical subassembly may be provided comprising a second image sensor responsible for camera monitoring applications. In this case, a camera is arranged pointing out substantially to a rearward direction. Also, in this case, the bracket may be provided in at least one of the first optical subassembly or the second optical subassembly.

The first optical device can be thus positioned such that the first optical subassembly is arranged to capture top-view images of a right side area of the motor vehicle and the second optical subassembly is arranged to capture images from the rear of the motor vehicle.

The first optical subassembly may be adapted to move relative to the first surface of the housing in three degrees of freedom, regarding to movements performed on perpendicular planes, in the first condition of the attaching means. That is, the first condition of the attaching means may involve a first dimension, a second dimension, and a third dimension, the third dimension being rotation. The first condition may correspond to a condition before applying a curing process to the attaching means, and the second condition may correspond to a condition after applying said curing process. In one example, the attaching means are a cured adhesive suitable for bonding the optical subassembly to the first surface of the housing. Said adhesive may be initially cured in an initial curing process that may comprise exposure to UV light after the optical subassembly is placed in a given orientation. The initially cured adhesive is then further cured to a further cured strength in a secondary curing process sufficiently strong to hold the optical subassembly relative to a bracket that will be described further below, for use of the optical device in a motor vehicle.

The first surface of the housing may further comprise a first opening designed to at least partially receive the first optical subassembly. Said first surface may be planar, and the interface may be curved. However, it may be preferred that the first surface of the housing is curved with the interface comprising a curved or non-curved surface. More in particular, the first surface may be concave or convex in at least one direction and more in particular, the first surface may be concave or convex in two (perpendicular) directions (spherical). One side of the housing may be concave, and another side of the housing may be convex.

Within the meaning of the present disclosure, convex applies to a surface of the interface that is curved outwards to the bracket, while concave applies to a surface of the interface that is curved inwards to the interior of the housing. In any case, the radius of curvature of the curved surface of the interface may be substantially the same as the radius of curvature of the corresponding first surface of the housing. Also, the centre of curvature of the curved surface of the interface and that of the at least one of the corresponding first surface of the housing may fall on the same point.

The optical device may further comprise a second surface having a second opening, and a second optical subassembly having a second optical axis arranged at an angle with respect to the first optical axis and comprising a second lens. A second image sensor may be provided to be received in the second opening of the housing. The second surface may be convex or concave. In other words, where the optical device includes first and second surfaces with corresponding optical subassemblies, at least one of the first surface or the second surface is planar or at least one of the first surface or the second surface is non-planar such as, for example, curved such as cylindrical or partially hemispherical or fully spherical. Any configuration allows the optical subassemblies to be brought into the first or second conditions.

At least one of the first opening or the second opening of the housing may be larger than the corresponding first image sensor or second image sensor. As a result, a gap may exist between a given image sensor and a corresponding opening. Such gap is suitable to move, e. g. displace, rotate, slide, etc. the optical subassembly, so as to be positioned, i.e. oriented, with their corresponding optical axes arranged at a given orientation before at least one of the first or second optical subassemblies is fixedly attached to the housing as described above. That is, the gap between the first or second openings and the corresponding optical subassembly is such that the corresponding optical axis of the first or second optical subassemblies can be arranged at different suitable positions or orientations before at least one of the first or second optical subassemblies is fixedly attached to the housing. Said orientations merely result from a geometrical interference at the point where the brackets contact to each other and may range for example from +5° to −5° or from +8° to −8°. Other values are possible. Thus, more in general, the first opening or the second opening can be moved relative to the corresponding optical subassembly such that the corresponding optical axis of the first or second optical subassemblies can be moved to be arranged at different orientations within an angle ranging from +45° to −45° before at least one of the first or second optical subassemblies is fixedly attached to the housing. In particular, it may be preferred that the first opening or the second opening can be moved relative to the corresponding optical subassembly such that the corresponding optical axis of the first or second optical subassemblies can be moved to be arranged at different orientations within an angle ranging from +30° to −30°.

The diameter of at least one of the first and second openings may correspond to an outer diameter of an electric cable coming from the optical subassembly to a serializer to pass through.

In short, the optical device may be configured to have:
no openings such that the whole optical subassembly is mounted outside the housing and captured image data are wirelessly transmitted,
at least one opening sized such that a data or power cable can be passed through, and
at least one opening sized such that it is greater than the corresponding image sensor when the image sensor is arranged within the housing, that is, when the optical subassembly is partially inserted into the housing.

The above described configuration provides for a single camera housing and subassembly to be used for a large number of different car models by simply positioning the subassemblies as required. Said configuration has been shown to be advantageous when at least one of the first optical subassembly or the second optical subassembly is a monitoring system for providing images from the rear of the vehicle, and at least one of the other of the first optical subassembly or the second optical subassembly is a video camera for providing top-view images from the ground in the surroundings of the vehicle.

The image sensor or photo-sensor may be arranged inside the first subassembly and the second subassembly. However, the first subassembly and the second subassembly may be part of the same structure of the camera housing, for example once they have been welded, or they can be joined by a fastening, fixing or attaching means such as glue or dual band adhesive tape. The subassemblies can be thus separate modules to be attached to the camera housing. The bracket may also be configured to support at least one electronics carrier or substrate such as a printed circuit board (PCB). In some cases, the bracket may be configured to support a main printed circuit board and a secondary printed circuit board. In that case, the secondary printed circuit board may be configured as an Electronic Control Unit (ECU), preferably as an Image Signal Processor (ISP). The image sensor and the printed circuit board may be located within the housing. The main printed circuit board and the secondary printed circuit board may be both carried by the bracket.

The bracket may have an interface for attachment to at least one of the first surface or the second surface of the housing at a given orientation. Said bracket interface may have a non-planar surface, such as a curved surface, for example, a convex surface or a concave surface. In this case, the radius of curvature of the bracket interface curved surface is substantially the same as the radius of curvature of at least one of the corresponding first surface or the second surface of the housing. It is also preferred in that case that the centre of the curvature of the bracket interface curved surface and that of the at least one of the corresponding first surface or the second surface of the housing fall on the same point. In particular, the radius of curvature of the bracket interface curved surface may range from 100 to 5 mm, preferably it may range from 50 to 10 mm, and in one example it may be 15 mm.

In the present optical device, at least one of the first optical subassembly or the second optical subassembly may be a camera monitoring system (CMS) video camera. The CMS video camera is suitable for providing images from a side or rear portion of the vehicle. Also, in the present optical device, at least one of the other first optical subassembly or the second optical subassembly may be a video camera for providing top-view images from the ground in the surroundings of the vehicle.

The first lens and the first image sensor of the first optical subassembly are both aligned along the first optical axis. In turn, the second lens and the second image sensor of the second optical subassembly are both aligned along the second optical axis.

An optical system for providing image information from surrounding areas of a motor vehicle as claimed in claim 15 is also disclosed herein.

The present optical system comprises at least a first optical device as described above positioned such that the first optical subassembly is arranged to capture top-view images of a left side area of the motor vehicle and at least a second optical device as described above arranged to capture images from the rear of a motor vehicle side and such that the first optical subassembly is arranged to capture top-view images of a right side area of the motor vehicle and such that the second optical subassembly is arranged to capture images from the rear of the motor vehicle. However, the optical devices may be positioned in other different locations of the motor vehicle such as for example in a front location (e.g. in a front bumper) or in a rear location (e.g. instead of a parking camera) of the motor vehicle for top-view, front view, and rear/parking view and backup camera applications, for example. The optical devices may be also positioned in a vehicle roof, e.g. in shark-fin devices, for example in vans and the like.

A controller is provided which is configured to provide image data deriving from the optical devices to at least one display. The controller is configured to provide image data deriving from the optical devices to at least one display.

According to the above, a one-piece housing may be provided configured to receive one or more optical subassemblies arranged into a plurality of orientations within an opening. In this way, a relative angle, in fact a first angle and a second angle perpendicular thereto, between the two subassemblies can be different for a given camera housing and corresponding subassemblies. As stated above, both the first and second optical subassemblies have three degrees of freedom, that is, two degrees of freedom and rotation around the optical axis, with the second degree of freedom being defined relative to the above mentioned second angle perpendicular to the first angle.

BRIEF DESCRIPTION OF THE DRAWINGS

Non-limiting examples of the present disclosure will be described in the following, with reference to the appended drawings in which one example of the present optical device is illustrated. In the drawings.

DETAILED DESCRIPTION

Figure 1:
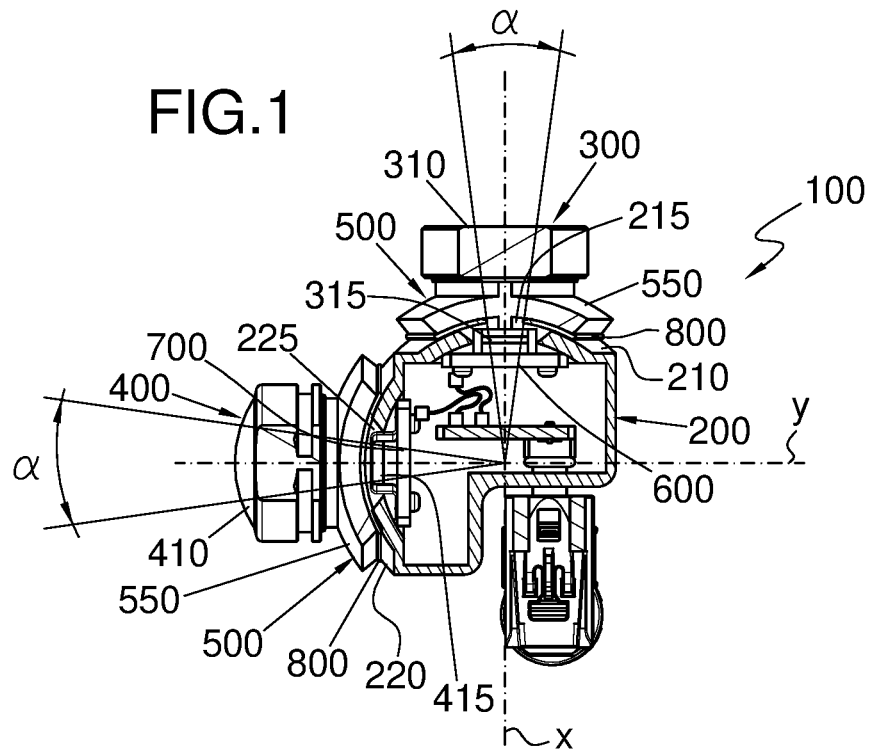
FIG. 1 is a sectional view of one example of the present optical device taken along line 2-2 of FIG. 2.
Figure 2:
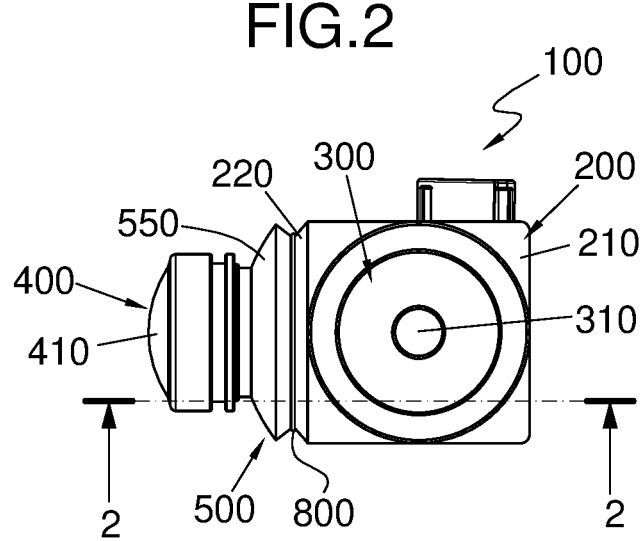
FIG. 2 is a top view of the optical device in FIG. 1.

Generally, FIGS. 1 and 2 show one example of the present optical device 100. It comprises a housing 200 having a first opening 215 and a first optical subassembly 300. The first optical subassembly 300 is partially inserted into the housing 200 although examples where the first optical subassembly 300 is outside the housing 200 are also possible. The first optical subassembly 300 is allowed to move, displace, rotate, slide, etc. relative to the housing 200 by means of an actuator, such as a rear-view mirror. The present optical device 100 may be fixed to a surface of the motor vehicle, such as for example a door outer surface so that several field of view angles can be obtained The housing 200 of the present optical device 100 comprises at least a first surface 210 having a first opening 215 for reviving a first camera lens 310 and a first image sensor 315. The first camera lens 310 and the first image sensor 315 are part of a first optical subassembly 300 having a first optical axis x associated therewith. The first optical subassembly 300 can be rotated about an axis X. This is important where the first image sensor 315 is rectangular in shape.

Figures show the first optical subassembly 300 having the first camera lens 310 although a number of camera lenses may be included as required. A bracket 500 is also provided having a cylindrical barrel. The barrel has a base member preferably flat and circular in shape containing or being part of an electronics carrier or substrate such as a printed circuit board (PCB) 600 having a first flat surface and a second flat surface. The first image sensor 315 is arranged on the first surface of the PCB 600. Said first surface of the PCB 600 is connected to the bracket barrel. The bracket has a projection projecting outward arranged in an upper portion of the above mentioned bracket barrel. Projections may be however located halfway up at the bracket barrel. In one example, projections are non-flat or curved in at least one direction such as curved in two perpendicular directions, that is, partially spherical. The camera lens 310 is at least partially inserted inside the bracket 500. An upper surface of the bracket interface 550 is attached, e.g. glued, to the camera lens 310.

Attaching means 800 are provided for attaching the bracket 500 with the corresponding first optical subassemblies 300 to the housing 200. In one specific, non-limiting example shown, the attaching means 800 may include a glue or an adhesive sheet to attach the bracket 500 with the corresponding first optical subassemblies 300 to the housing 200. Other attaching means 800 may be of course used such as a threaded coupling.

An inner surface of the bracket interface 550 is attached through said attaching means 800, e.g. glued, to the surface of the housing 200. The image sensor 315 is surrounded at the top by the lens 310, laterally by the bracket 500, and at the bottom by the above mentioned PCB 600. Once suitable or desired positioning or orientation of the camera lens 310 in the optical device 100 has been achieved, glue, for example, is cured, such as by ultraviolet irradiation, such that the optical subassembly 300 is held in position and do not move.

As shown in the figures, the first camera lens 310 and the first image sensor 315 in the first optical subassembly 300 are both aligned along the above mentioned first optical axis x. Such image sensor-lens 315, 310 alignment is achieved by swinging or sliding the bracket 500 suitably. The housing 200 is configured to receive the optical subassembly 300 which is in turn configured to receive the camera lens 310.

The first opening 215 is larger than the corresponding first image sensor 315 and second image sensor 415. A gap therefore exists between the opening 215 and the image sensors 315. Such gap is suitable for the optical subassembly 300 to be suitably positioned with their above mentioned corresponding optical axes x arranged at a given orientation before the first optical subassemblies 300 is fixedly attached, e.g. glued, to the housing 200.

In the example shown, at least one portion of the optical subassembly 300 is larger than the first opening 215. The farthest points of the bracket 500 are separated by a distance greater than the first opening 215.

The first surface 210 of the present optical device 100 may be non-planar such as for example curved, more specifically convex or concave. In this respect the subassemblies 300 can be received in the same camera housing 200 with the subassembly facing a given orientation or focus.

An optical device 100 for a motor vehicle is disclosed herein comprising a housing 200 defining an interior space for receiving optical device parts and electronics therein. The housing 200 comprises a first part such as a main housing or front housing part, not shown, and a second part such as a cover or back housing part, not shown. As shown in the drawings, the housing 200 comprises at least a first surface 210. The first surface 210 of the housing 200 has a first opening 215 for reiving a first camera lens 310 and a first image sensor 315. The first lens 310 and the first image sensor 315 are part of a first optical subassembly 300 having a first optical axis x associated therewith.

As stated above and as shown in the example shown, the optical device 100 comprises brackets 500 each associated with the first optical subassembly 300 and the second optical subassembly 400. The brackets 500 are configured for supporting the first image sensor 315 of the first optical subassembly 300 and the second image sensor 415 of the second optical subassembly 400. Each bracket 500 is suitable for holding the first camera lens 310 and for supporting the first image sensor 315 directly or through the PCB 600.

In the example shown, the bracket 500 has a bracket interface 550 defined for attachment to the first surface 210 or to the second surface 220 of the housing 200 at a given orientation. In the example shown, said first and second surfaces 210, 220 are curved. The radius of curvature of said curved surface may be substantially the same as the radius of curvature, 15 mm in this example, of at least one of the corresponding first or second surfaces 210, 220 of the housing 200. Also, the centre of the curvature of the curved surface of the bracket interface 550 and that of the at least one of the corresponding first or second surfaces 210, 220 of the housing 200 fall in this case on the same point, so it is concentrically arranged thereto. The radius of curvature of the bracket interface 550 is substantially greater that the first or second surfaces 210, 220 as the bracket 500 is higher or further away of the centre of the curvature.

The first camera lens 310 and the second camera lens 410 may thus be held according to a suitable orientation with the curved surfaces 210, 220 of the housing 200 properly attached to those of the bracket interface 550. This is because the bracket 500 is allowed to slide through its bracket interface 550 on the surfaces 210, 220 of the housing 200 before it is fixedly attached, e.g. glued, to the housing 200 when suitable positioning or orientation of the camera lenses 310, 410 in the optical device 100 has been achieved.

Before glue has been cured, at least one of the first camera lens 310 and the second camera lens 410 is allowed to one or more of moving, displacing, rotating, sliding, tilting, swinging, or the like, etc. when the first surface 210 of the housing 200 and the bracket interface 550 are curved having the same radius of curvature. In other examples, before glue has been cured, at least one of the first camera lens 310 and the second camera lens 410 is allowed to one or more of moving, displacing, rotating, sliding, tilting, swinging, or the like, etc. when at least one of the first surface 210 of the housing 200 and the bracket interface 550 is curved and the other of the first surface 210 of the housing 200 and the bracket interface 550 is non-curved.

In general, the bracket 500 is allowed to slide before glue has been cured when both the first surface 210 and the bracket interface 550 are curved and have the same radius of curvature, and the bracket 500 is allowed to tilt and/or swing before glue has been cured when at least one of the first surface 210 and the bracket interface 550 are curved and the other of the first surface 210 or the bracket interface 550 are non-curved.

The example where both the first surface 210 and the bracket interface 550 are curved and have the same radius of curvature is preferred since a larger contact surface is available resulting in enhanced sealing while the thickness of the glue or adhesive tape remains constant such as for example of the order of 0.5 mm.

Glue or adhesive tape may be positioned in one bottom surface of the bracket interface 550 or it may be positioned in one top surface of the first surface 210 of the housing 200. Adhesive curing may for example consist in applying ultraviolet light during about e.g. 5-20 seconds although this may vary depending on several factors and subsequently feeding it into a furnace during about 5-10 minutes under 100° C. without exceeding maximum temperature at the maximum electronics allowable temperature which is usually 120° C.

Non-limiting examples of orientations of the camera lens 310 in the optical device 100 are of the order of 8° in each direction, that is, 16° in total. The optical subassembly 300 can be each rotated around two axes one of which is perpendicular to the drawings.

As shown in the figures, the optical device 100 for a motor vehicle has two subassemblies: a first subassembly 300 and a second subassembly 400. The first subassembly is mounted on the first surface 210 of the housing 200, and the second subassembly is mounted on the second surface 220 of the housing 200. In particular, both subassemblies 300, 400 are partially located outside of the housing 200.

Also as shown in the figures, the first camera lens 310 and the first image sensor 315 in the first optical subassembly 300 are both aligned along the above mentioned first optical axis x. Likewise, the second camera lens 410 and the second image sensor 415 of the second optical subassembly 400 are both aligned along the above mentioned second optical axis y.

In the example shown, the first opening 215 and the second opening 225 of the housing 200 are larger than the corresponding first image sensor 315 and second image sensor 415. A gap exists between the openings 215, 225 and the image sensors 315, 415. Such gap is suitable for the optical subassembly 300, 400 to be suitably positioned with their above mentioned corresponding optical axes x, y arranged at a given orientation before at least one of the first or second optical subassemblies 300, 400 is fixedly attached, e.g. glued, to the housing 200. Specifically, according to the example shown, the gap is formed between the barrel of the bracket 500 and the opening 215, 225.

It may be preferred that the gap between the first or the second openings 215, 225 and the corresponding optical subassembly 300, 400 is such that the corresponding optical axis x, y of the first or second optical subassemblies 300, 400 can be arranged at different orientations according to an angle α ranging from +8° to −8° from a given orientation before at least one of the first or second optical subassemblies 300, 400 is fixedly attached, e.g. glued, to the housing 200.

As the α angle is varied, the subassemblies 300 and 400 slide such that they move closer to each other until they contact each other. In the example shown the angle α is 8° although other values are possible.

At least one of the first surface 210 or the second surface 220 of the present optical device 100 may be non-planar such as for example curved, more specifically convex or concave. Non-flat geometry of the surface of the housing 200 and the first and/or second optical subassemblies 300, 400 is of utmost significance particularly when two or more cameras are provided. In this respect, two or more subassemblies 300, 400 can be received in the same camera housing 200 with each subassembly facing a given orientation or focus.

In the example shown, the optical device 100 comprises brackets 500 each associated with the first optical subassembly 300 and the second optical subassembly 400. The brackets 500 are configured for supporting the first image sensor 315 of the first optical subassembly 300 and the second image sensor 415 of the second optical subassembly 400.

In the example shown, the bracket 500 has a bracket interface defined for attachment to the first surface 210 or to the second surface 220 of the housing 200 at a given orientation. In the example shown, said first and second surfaces 210, 220 are curved. The radius of curvature of said curved surface may be substantially the same as the radius of curvature, for example, 15 mm, of at least one of the corresponding first or second surfaces 210, 220 of the housing 200. Also, the centre of the curvature of the curved surface of the bracket interface 550 and that of the at least one of the corresponding first or second surfaces 210, 220 of the housing 200 fall in this case on the same point. The first camera lens 310 and the second camera lens 410 may thus be held according to a suitable orientation with the curved surfaces 210, 220 of the housing 200 properly attached to those of the bracket interface 550. This is because the bracket 500 is allowed to slide through its bracket interface 550 on the surfaces 210, 220 of the housing 200 before it is fixedly attached, e.g. glued, to the housing 200 when suitable positioning or orientation of the camera lenses 310, 410 in the optical device 100 has been achieved.

In the specific, non-limiting example shown, a glue or an adhesive sheet is used to attach the bracket 500 with the corresponding first and second optical subassemblies 300, 400 to the housing 200. Other attaching means 800 may be of course used such as a threaded coupling. Once said positioning or orientation of the camera lenses 310, 410 in the optical device 100 has been achieved, said glue is cured, such as by ultraviolet irradiation, such that the optical subassemblies 300, 400 are held in position and do not move. Non-limiting examples of orientations of the camera lenses 310, 410 in the optical device 100 are of the order of 8° in each direction, that is, 16° in total. The optical subassemblies 300, 400 can be each rotated around two axes.

In the present optical device 100, the first and second optical subassemblies 300, 400 include corresponding printed circuit boards 600, 700 carried by the bracket 500. A main printed circuit board 600 is carried by the bracket 500 in the first optical subassembly 300 configured as a main Electronic Control Unit (ECU), particularly as an Image Signal Processor (ISP) for processing top-view images from the optical devices 100. The ISP may be provided in the same PCB as the image sensor 315, 415 or not. There may be cases where each optical subassembly 300, 400 has two PCB's 600, 700 such as for example in parallel, spaced apart by a 2-20 mm gap, one above the other, with one PCB being associated with one image sensor 315, 415 and the other PCB being associated with the ISP.

Images, such as top-view images, may be displayed through either a dashboard display unit or a display fitted in the interior rear-view mirror which may be a touch display, for example. A secondary PCB (ISP) 700 is carried by the bracket 500 in the second optical subassembly 400. A third PCB configured as a serializer having a power supply is also provided. The third PCB is arranged outside at least one of the first and second optical subassemblies 300, 400 inside the optical device 100. The third PCB is connected both to the main printed circuit board 600 and on the other hand to a connector such as a power over coax or a flex.

The first optical subassembly 300 or the second optical subassembly 400, or both the first and second optical subassemblies 300, 400 may be part of a camera monitoring system (CMS) video camera. The CMS video camera is configured to provide images from the rear of the vehicle. Also, in the example, the first optical subassembly 300 or the second optical subassembly 400, or both the first and second optical subassemblies 300, 400 may be a video camera for providing top-view images from the ground in the surroundings of the vehicle.

In the example shown, the CMS video camera has a frame rate of more than 30 frames per second, preferably 60 frames per second while the top-view camera has a frame rate lower than CMS such as 15 frames per second.

The above described optical device 100 may be advantageously fitted in an optical system for providing image information from surrounding areas of a motor vehicle. Such optical system may comprise the above described optical device 100 arranged such that the first optical subassembly 300 is positioned for capturing top-view images of a left side area of the motor vehicle and such that the second optical subassembly 400 is positioned for capturing images from the rear of a motor vehicle side. The optical system may further comprise another optical device 100 as described above positioned such that the first optical subassembly 300 is positioned for capturing top-view images of a right side area of the motor vehicle and such that the second optical subassembly 400 is positioned for capturing images from the rear of the motor vehicle. The optical system may further comprise a controller configured to provide image data deriving from the optical devices 100 to at least one display.

The above described optical system may be embodied as a winglet, preferably two winglets in a motor vehicle with each winglet comprising the above described optical device 100. Images from the camera monitoring system (CMS) video camera from the rear of the vehicle can be thus displayed by a display, preferably a touch display, positioned on the inside of a vehicle door. Images displayed by said display can be panned by the user through a touch-and-drag action or by means of a joystick. As the image is panned, the winglet is either moved or a mask or image display section is smaller than the image captured by the CMS camera of the optical device such that said mask is movable within the captured image.

The vision system of the vehicle comprises (i) a forward viewing camera having a field of view forward of the vehicle, (ii) a rearward viewing camera having a field of view rearward of the vehicle, (iii) a driver-side viewing camera pointing substantially to the ground (top view driver's camera), (iv) a passenger-side sideward viewing camera pointing substantially to the ground (top view passenger's camera). The vision system further comprises (v) a driver-side viewing camera having a sideward field of view at the driver side of the view encompassing a portion of the lateral side of the vehicle (CMS driver's view), and (vi) a passenger-side sideward viewing camera having a sideward field of view at the passenger side view encompassing a portion of the lateral side of the vehicle (CMS passenger's view).

An image processing system is operable to process image data captured by (i), (ii), (iii) and (iv), so as to synthesize a composite image derived from said captured image data. Further, a second image processing system is operable to process image data captured by (v) to show the image in a display, preferably located in the vehicle, and more preferably located on the driver's door. Further, a third image processing system is operable to process image data captured by (vi) to show the image in a display, preferably located in the vehicle, and more preferably located on the passenger's door.

Although only a number of examples have been disclosed herein, other alternatives, modifications, uses and/or equivalents thereof are possible. For example, the camera housing is not limited to a particular shape and it may for example be prismatic having six substantially flat surfaces, although other different geometries are also possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

A method is also disclosed herein for mounting the optical subassembly described above. The method comprises providing an image sensor on a printed circuit board (PCB), mounting said PCB on the bracket, attaching the lens to the bracket for example through the use of glue applied on an upper surface of the bracket interface or on the lens, or both on an upper surface of the bracket interface and the lens. The lens may be attached to the bracket through other means such as by screwing. The lens is placed, i.e. orientated, in a suitable or desired position and brought into focus with the image sensor to be optically center-aligned therewith. The lens and the image sensor are thus aligned. Where the attaching means comprise glue, glue is then cured such as by UV or thermal radiation. The optical subassembly is then mounted to the housing. Sealing glue is applied to an outer surface in the exterior of the housing and/or in a lower surface of the bracket interface. The optical subassembly is then positioned at a given position and the glue is then finally cured such as by UV or thermal radiation.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

The invention claimed is:

1. An optical device for a motor vehicle, the optical device comprising:
    a housing that comprises at least a first surface;
    a first optical subassembly having a first optical axis (x) and comprising a first lens, a first image sensor, and a bracket suitable for holding the lens and for supporting the first image sensor;
    an attaching means adapted to bring the first optical subassembly into a first condition in which it can be moved relative to the first surface and into a second condition in which a bracket interface of the bracket is fixedly attached to the first surface; and
    wherein the bracket interface is at least partially mounted on the first surface of the housing, and wherein the first image sensor is aligned to the first lens, and wherein the attaching means is in contact to the bracket interface and the first surface, and wherein at least one of the first surface and the bracket interface is a non-planar surface so as to bring the first optical subassembly from the first condition into the second condition, wherein the first surface includes a first opening communicating through the housing and designed to at least partially receive the first optical subassembly such that the first optical axis extends through the first opening.

2. The optical device of claim 1, wherein the bracket interface is arranged to extend outwardly relative to the first optical axis (x).

3. The optical device of claim 2, wherein the first optical subassembly is adapted to move relative to the first surface of the housing in three degrees of freedom in the first condition of the attaching means.

4. The optical device of claim 1, wherein the first optical subassembly is adapted to move relative to the first surface of the housing in three degrees of freedom in the first condition of the attaching means.

5. The optical device of claim 4, wherein the first surface is curved and the bracket interface comprises a non-curved surface, or wherein the first surface is planar and the bracket interface is curved.

6. The optical device of claim 5, wherein the first surface is curved and the bracket interface comprises a curved surface.

7. The optical device of claim 6, wherein the radius of curvature of the curved surface of the bracket interface is substantially the same as the radius of curvature of the corresponding first surface of the housing.

8. The optical device of claim 1, wherein the first surface is curved and the bracket interface comprises a non-curved surface, or wherein the first surface is planar and the bracket interface is curved.

9. The optical device of claim 1, wherein the first surface is curved and the bracket interface comprises a curved surface.

10. The optical device of claim 1, wherein an inward facing surface of the bracket interface is a curved surface, the first surface is a curved, the first surface opposes the curved surface, and the radius of curvature of the curved surface of the bracket interface is substantially the same as the radius of curvature of the opposing first surface of the housing.

11. The optical device of claim 1, wherein the bracket interface includes a curved surface, the first surface is curved, and the centre of the curvature of the curved surface of the bracket interface and that of the corresponding first surface of the housing fall on the same point.

12. The optical device of claim 1, wherein the attaching means is located between the bracket interface and the first surface.

13. An optical device for a motor vehicle, the optical device comprising:
   a housing that comprises at least a first surface;
   a first optical subassembly having a first optical axis (x) and comprising a first lens, a first image sensor, and a bracket suitable for holding the lens and for supporting the first image sensor;
   an attaching means adapted to bring the first optical subassembly into a first condition in which it can be moved relative to the first surface and into a second condition in which a bracket interface of the bracket is fixedly attached to the first surface;
   wherein the bracket interface is at least partially mounted on the first surface of the housing, and wherein the first image sensor is aligned to the first lens, and wherein the attaching means is in contact to the bracket interface and the first surface, and wherein at least one of the first surface and the bracket interface is a non-planar surface so as to adjust the first optical subassembly from the first condition and into the second condition;
   the housing including a second surface;
   a second optical subassembly having a second optical axis (y) and comprising a second lens, a second image sensor, and a bracket suitable for holding the second lens and for supporting the second image sensor;
   an attaching means adapted to bring the second optical subassembly into a first condition in which it can be moved relative to the second surface and into a second condition in which a second interface is fixedly attached to the second surface; and
   wherein the second interface is at least partially mounted on the second surface of the housing, and wherein the second image sensor is aligned to the second lens, and wherein the attaching means is in contact to the second interface and the second surface, and wherein at least one of the second surface and the second interface is a non-planar surface so as to adjust the second optical subassembly from the first condition and into the second condition, and wherein the second optical axis (y) is arranged to be displaced by an angle ($\alpha$) measured where the first optical axis (x) intersects the second optical axis (y).

14. The optical device of claim 13, wherein the second optical subassembly is adapted to move relative to the second surface of the housing in three degrees of freedom in the first condition of the attaching means, such that the first or second optical subassemblies can be moved relative to each other such that the optical axis (x, y) of the first or second optical subassemblies can be arranged at different orientations according to an angle ($\alpha$) ranging from +45° to −45° before at least one of the first or second optical subassemblies is fixedly attached to the housing.

15. The optical device of claim 13, wherein the second interface is arranged to extend outwardly relative to the second optical axis (y), and wherein the second surface is curved and the second interface comprises a non-curved surface, or wherein the second surface is planar and the second interface is curved.

16. The optical device of claim 13, wherein the second surface is curved and the second interface comprises a curved surface, wherein the radius of curvature of the curved surface of the second interface is substantially the same as the radius of curvature of the second surface, and wherein the centre of the curvature of the curved surface of the second interface and the corresponding second surface of the housing fall on the same point.

17. The optical device of claim 13, wherein at least one of the first optical subassembly or the second optical subassembly is a camera monitoring system video camera providing images from the rear of the vehicle, and at least one of the other first optical subassembly or the second optical subassembly is a video camera for providing top-view images from the ground in the surroundings of the vehicle.

18. An optical system for providing image information from surrounding areas of a motor vehicle, the system comprising:
   at least a first optical device according to claim 13 positioned such that the first optical subassembly is arranged to capture top-view images of a left side area of the motor vehicle;
   at least a second optical device according to claim 13 arranged to capture images from the rear of a motor vehicle side and such that the first optical subassembly is arranged to capture top-view images of a right side area of the motor vehicle and such that the second optical subassembly is arranged to capture images from the rear of the motor vehicle; and
   a controller configured to provide image data deriving from the optical devices to at least one display.

* * * * *